(12) United States Patent
Fu

(10) Patent No.: US 12,401,571 B2
(45) Date of Patent: Aug. 26, 2025

(54) SYSTEMS AND METHODS FOR VIDEO PLAYER SIMULATION

(71) Applicant: NBCUniversal Media, LLC, New York, NY (US)

(72) Inventor: Qiang Fu, San Jose, CA (US)

(73) Assignee: NBCUniversal Media, LLC, New York, NY (US)

( * ) Notice: Subject to any disclaimer, the term of this patent is extended or adjusted under 35 U.S.C. 154(b) by 93 days.

(21) Appl. No.: 17/988,331

(22) Filed: Nov. 16, 2022

(65) Prior Publication Data

US 2024/0163180 A1    May 16, 2024

(51) Int. Cl.
*G06F 15/173* (2006.01)
*H04L 41/14* (2022.01)
*H04N 21/24* (2011.01)

(52) U.S. Cl.
CPC ....... *H04L 41/145* (2013.01); *H04N 21/2401* (2013.01); *H04N 21/2402* (2013.01)

(58) Field of Classification Search
CPC .............. H04L 41/145; H04N 21/2401; H04N 21/2402
See application file for complete search history.

(56) References Cited

U.S. PATENT DOCUMENTS

| | | | |
|---|---|---|---|
| 2013/0060958 A1* | 3/2013 | Keum | H04N 21/47214 709/231 |
| 2020/0099733 A1* | 3/2020 | Chu | H04N 21/8456 |
| 2020/0152234 A1* | 5/2020 | Sharma | H04N 21/8358 |

* cited by examiner

*Primary Examiner* — Yves Dalencourt
(74) *Attorney, Agent, or Firm* — Fletcher Yoder, P.C.

(57) ABSTRACT

A computer-implemented method may include receiving a streaming algorithm for testing and receiving historical network conditions of a player system. Simulating content streaming based on the historical network conditions and the streaming algorithm may include identifying a version of a fragment of content to be used in the simulated content streaming, simulating a download finish event of the fragment, and simulating a buffer level adjustment based on the simulated complete download of the fragment of the content. In response to performing the simulated content streaming, the computer-implemented method may report information associated with the simulated content streaming, thus enables measuring performance impact of player code change before deploying the updated player to production environment with neither conventional video nor audio playback.

19 Claims, 10 Drawing Sheets

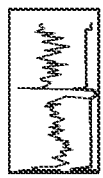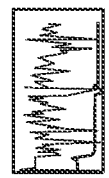
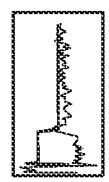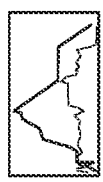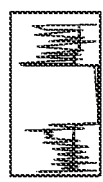
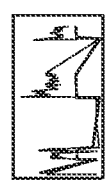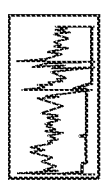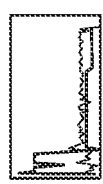
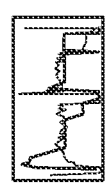
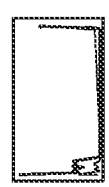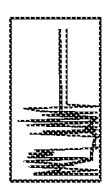
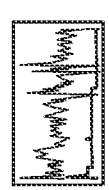
FIG. 6

SYSTEMS AND METHODS FOR VIDEO PLAYER SIMULATION

BACKGROUND

The invention relates generally to systems and methods for evaluating content players. More specifically, the present disclosure relates to evaluating performance impact of streaming algorithms of content players (e.g., video and audio players) before production deployment without video or audio playback.

Various consumer media viewing devices, such as televisions, computers, handheld devices (e.g., mobile device, content players, gaming systems, and so forth) are configured to display content received from one or more content providers. The media content may be streamed on the content players such that the content may not be fully transmitted before playback begins. Instead, a streaming algorithm may request downloading of video and/or audio fragments in real time during the playback session. Content players typically include a buffer that holds a pre-loaded portion of the content prior to playback, in an effort to maintain playback when network conditions vary. In certain instances, the media content may be played back at a faster rate than a streaming algorithm of the content player may download new fragments, causing the buffer to empty. As such, when the buffer level empties to a pre-defined threshold, the media content displayed on the video player may pause playback to refill the buffer to a desired level, otherwise known as a "buffer underrun." As may be appreciated, a buffer underrun may undesirably impact performance and/or a provided experience of the consumer media viewing device, causing undesirable pauses in playback. Streaming algorithms of the content players may include variables that impact playback of the content based upon observed characteristics. For example, these algorithms may identify when to utilize high quality (e.g., bit rate) content as opposed to lower bit rate content, when to trigger a buffer underrun, etc. Thus, it is important to perform extensive testing on these streaming algorithms to understand how changes to the algorithms may impact the content playback experience.

Currently, performance impact of streaming algorithms of a content player are determined after an updated content player is deployed to production and streaming statistics are collected from user data from actual playback using the playback algorithm. This type of testing is problematic for many reasons. For one, such a technique may result in undesirable playback experiences by providing "go-live" for un-vetted playback algorithms. Further, video and audio playback time may be a bottleneck in performance impact testing of the content player since a content player may be limited to testing twenty-four hours worth of media content per day. Furthermore, content players may be implemented in a variety of different consumer viewing devices and each device may be individually tested. In certain instances, an average number of playback hours needed to test one week's worth of user data may be upwards of 357,000 hours. While multiple devices may be used for performance testing, the robust performance evaluating the impact of algorithmic changes (e.g., changes of streaming algorithms) to may be both resource-intensive and time-consuming. Thus, improvements for testing content players prior to production deployment are desired.

SUMMARY

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

The embodiments described herein use historical network characteristics in conjunction with a playback algorithm to simulate playback of streaming content without requiring actual download and/or playback of all of the content. During the simulation, playback metrics are observed and used to test/evaluate the streaming algorithm (e.g., the resultant quality of playback via the content player using the playback algorithm). In this manner, playback algorithms may be evaluated efficiently across a wide range of devices prior to actual deployment for use by end users.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 6 is a graph illustrating various patterns of historical network characteristic data, which may be received by the player system of FIG. 1, in accordance with an aspect of the present disclosure;

DETAILED DESCRIPTION

Figure 1:
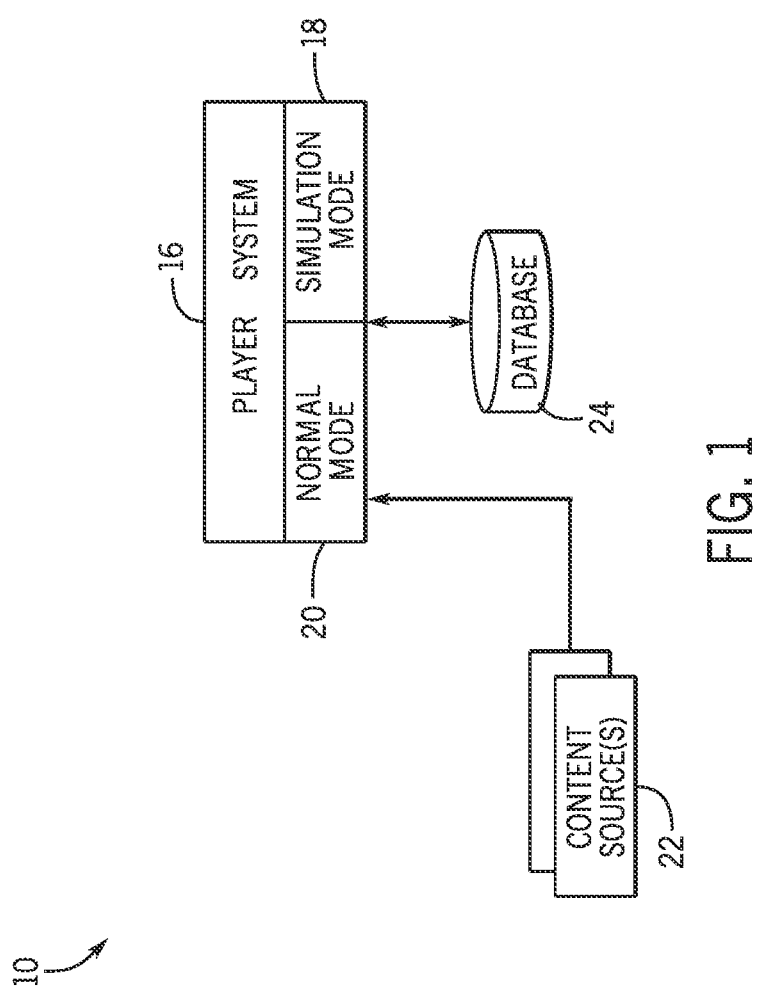
FIG. 1 is a schematic diagram of an exemplary simulation testing system including a player system, in accordance with an aspect of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present embodiments described herein facilitate and improve testing of streaming algorithms for content players prior to product deployment. It may be beneficial to update streaming algorithms in content players to fix bugs and improve streaming performance to provide a higher quality of service to users. For example, a key performance indicator (KPI) for measuring quality of service may be a number of buffer underruns during a playback session or a number of buffer underruns based on the average number of playback hours per week on all consumer media viewing devices. In some instances, a KPI may include an indication of how often a playback algorithm spends providing relatively lower bit rate content versus higher quality content. Currently, the performance impact of a content player change (e.g., streaming algorithm change) may be determined only after the player is deployed to production and streaming statistics are collected from user data. However, waiting for the user's streaming statistics may be time-consuming, which makes experimenting with different streaming algorithms for content players difficult.

Furthermore, simulating performance testing in a lab environment may be difficult since the average number of playback hours per week across multiple consumer content viewing devices may be large. For example, an average number of playback sessions per week may be upwards of 238,000 and each average playback session may be 1.5 hours. As such, the average number of playback hours may be upwards of 357,000 hours. To simulate these hours in a lab, a content player may need to continuously run for 40.8 years to playback the content. Moreover, even testing 2.5% of the total playback hours require 1 years' worth of playback before performance impact data may be available. As such, systems and methods for testing streaming algorithms for content players without video or audio playback may be desired.

Embodiments of the present disclosure are directed to a simulation testing environment for performance testing streaming algorithms implemented by content players. For example, a player system (e.g., content player) may operate in two modes, a normal mode and a simulation mode. When operating in normal mode, streaming statistics (e.g., user data) may be generated and collected over a period of time. Based on the streaming statistics, the player system may identify one or more timing events and determine if a buffer underrun may occur. When operating in the simulation mode, the player system may performance test a modified streaming algorithm by processing the one or more timing events without playing back video and audio content. As such, the player system may quickly and efficiently determine the performance impact of modifying the streaming algorithm without playing back the content and prior to product deployment. Accordingly, the streaming algorithms of content players may be rapidly tested and improved.

With the preceding in mind, FIG. 1 is a schematic diagram of a simulation testing environment 10 for performance testing content players (e.g., video players). The simulation testing environment 10 may include a player system 16 that may operate in a simulation mode 18 and a normal mode 20. As illustrated, the player system 16 may be communicatively coupled to content source(s) 22 and a database 24. When operating in the normal mode 20, the player system 16 may implement a streaming algorithm, playback media content, and generate streaming statistics associated with the playback session. The streaming statistics may be stored within the database 24 for performance testing purposes (e.g., operation in the simulation mode 18). When operating in the simulation mode 18, the player system 16 may implement a modified streaming algorithm and test the modified streaming algorithm with the streaming statistics generated in the normal mode 20. In this way, performance testing of new streaming algorithms may be quickly and efficiently tested, thereby reducing the lifecycle of streaming algorithms and improving playback quality.

As illustrated, the player system 16 may be communicatively coupled to one or more content source(s) 22 to receive media content (e.g., content files, video fragments, and audio fragments). The content source(s) 22 may include one or more content distributors to provide media content for playback on the player system 16 in the normal mode 20. The content source(s) 22 may be a content distribution network (CDN) which may be geographically distributed network of servers for providing media content. When operating in the normal mode 20, the player system 16 may send a request to the content source(s) 22 for media content and the content source(s) 22 may provide a video fragment in a first streaming format (e.g., high definition) and a second video fragment of the content with a second streaming format (e.g., standard definition) for display. The content source(s) 22 may also transmit an audio fragment associated with the video fragment. The streaming algorithm may specify a frame rate, a quality (e.g., bit rate), a duration, a resolution, and the like of the media content.

Returning to the player system 16, the player system 16 may be a device or software application for implementing the playback of media content. For example, the player system 16 may be a consumer media view device software implemented on a video player electronic device used to display the media content to a user. In another example, the player system 16 may be a web browser that implements the playback of media content. The player system 16 may receive user input indicative of media content to be displayed, a quality (e.g., bit rate) of the content, a speed of the content, or the like. For example, the player system 16 may include one or more buttons to receive user input regarding media content for display.

The player system 16 may receive user input indicative of the media content for display and transmit a request to the content source(s) 22 to download the content. When streaming media content, player system 16 (via the streaming algorithm) may not download the entire content in a single file, rather the player system 16 may periodically download portions (e.g., video fragments, audio fragments) of the media content based on the streaming algorithm, which adapts particular fragments downloaded based upon network characteristics and/or conditions. In this way, the user may receive on-demand media content suited for network characteristics (e.g., network bandwidth) used by the player system 16.

In the normal mode 20, the streaming algorithm may determine a timing for downloading the video and audio fragments, a timing for displaying media content for the user, and increasing or decreasing a quality of the content downloaded and displayed. For example, the player system 16 may be communicatively coupled to the content source(s) 22 via a network (e.g., wireless communication network). Downloading video and audio fragments via the network may be limited by a network speed (e.g., bandwidth). A slower network speed may increase an amount of time to download the video and audio fragments in comparison to a higher network speed. To mitigate this latency, the streaming algorithm may request lower quality versions of subsequent fragments of the streamed content, resulting in more rapid download of the fragment (though at a cost to the quality of the content). Further, to continuously display content to the user, the player system 16 may download the video and audio fragments for storage within a buffer of the player system 16 prior to displaying the content. A buffer level may be an indicator of the quality of service provided by the player system 16.

For example, if video and audio fragments enter the buffer at a rate slower than video and audio fragments leaving the buffer, after a period of time, the buffer may be empty and the player system 16 may not be able to display content for the user. This event is referred to herein as a "buffer underrun." In this case, the player system 16 may pause the media content stream until additional video fragments may be downloaded. It may be understood that a key performance indicator (KPI) of performance impact of and/or quality of service provided by the content player (e.g., player system 16) may be measured by a number of buffer underruns. A greater number of buffer underruns may be associated with a lower quality of service while zero buffer underruns may be associated with an ideal quality of service provided by the player system 16.

During a playback operation (e.g., normal mode 20), the may implement the streaming algorithm that sends requests to the content source(s) 22 to download media content for display when operating in the normal mode 20. The player system 16 may store streaming statistics, such as a network speed profile, a type of media content, a quality of media content, or the like. The streaming statistics may be compiled after a playback session, referred to herein as "historical streaming data," and used for performance testing by the player system 16 in the simulation mode 18. The historical streaming data (e.g., streaming statistics) may include information to reconstruct a playback, such as a quality at a time period and/or a network profile. In certain instances, the historical streaming data may include information about advertisements inserted between the media fragments. The player system 16 may store the streaming statistics to the database 24 or a backend server. In another example, the streaming statistics may be collected from one or more backend server logs generated by different types of player system(s) 16 during the normal mode 20. As further described with respect to FIGS. 5 and 6, historical streaming data may be generated by different types of player system(s) 16 during one or more actual playback sessions (e.g., operating in the normal mode 20).

As described herein, measuring a number of buffer underruns may be both a time-consuming and resource-intensive task. To this end, the player system 16 may implement performance testing via the simulation mode 18 based on historical streaming data generated in the normal mode 20. The player system 16 may retrieve the streaming statistics from the database 24 for performance testing (e.g., simulation testing). For example, the player system 16 may also be communicatively coupled to a database 24, which may receive and store the historical streaming data over a period of time. The player system 16 may implement the simulation mode 18 to determine a quality of service (e.g., buffer underrun) provided by a modified streaming algorithm. The player system 16 may receive a modified or an updated streaming algorithm that may be different from the streaming algorithm implemented in the normal mode 20. The modified streaming algorithm may include one or more modified or updated parameters, such as a bit rate switching algorithm, a buffer level threshold, a timing for requesting content fragments, an adaptive bit rate algorithm of content fragments to be retrieved, and so on. Portions of the modified streaming algorithm may be the same or similar to portions of the streaming algorithm. In this way, the player system 16 may quickly and efficiently test new streaming algorithms prior to product deployment; and then, the new streaming algorithm may be immediately deployed to the product (e.g., normal mode 20).

To performance test the modified streaming algorithm, the player system 16 may retrieve the historical streaming data (e.g., network characteristics and/or conditions of a previous streaming session for a particular electronic device type corresponding to the streaming algorithm) and identify one or more events and/or timing information. The player system 16 may determine timing information and/or version information for downloading the video and audio fragments and arrival of the video and/or audio fragments via the historical network characteristics and/or conditions, by calculating a download time for fragments based upon fragments sizes and network speeds corresponding to particular simulated download times. With the one or more events and timing information, the player system 16 may determine quality of content fragments to be selected based upon the specification of the modified streaming algorithm, buffer fill levels based upon the simulated downloads and corresponding timings, and a number of buffer underruns that may occur based on the historical streaming data. In this way, performance of the modified streaming algorithm may be performed without actual video or audio playback or actual fragment downloading, thereby reducing an amount of time and resources needed for the testing.

Actual components and systems used in the present technique for performance testing content players and/or delivering media content may be disposed in central and/or distributed locations. That is, a number of storage devices, servers, communication devices, and so forth, may be connected by a network and reside at various sites and places. Moreover, the exemplary hardware configurations discussed herein are not meant to limit the technique. It may be understood that a variety of hardware and software configurations may accommodate the content delivery systems of the present technique.

Figure 2:
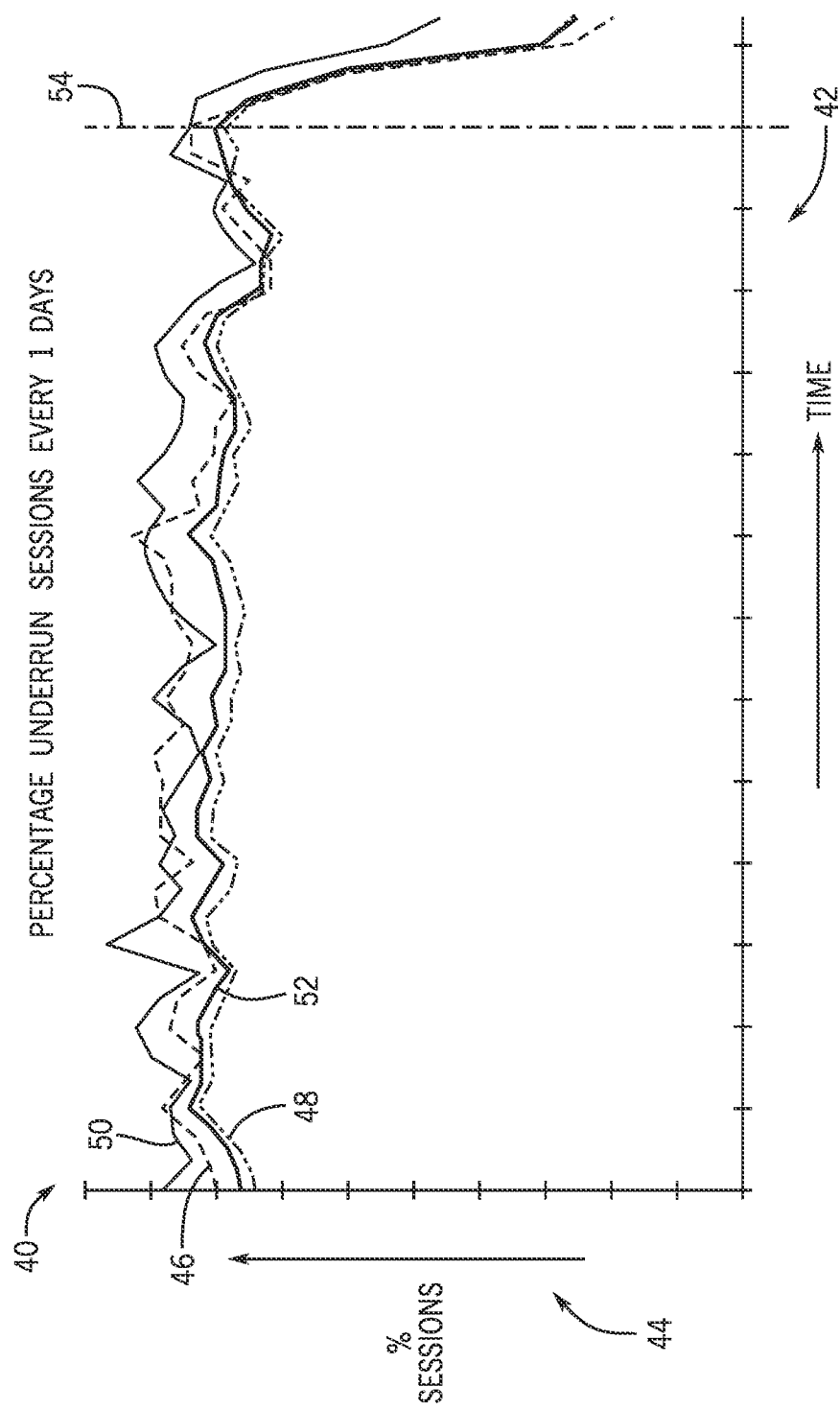
FIG. 2 is a graph illustrating performance testing results over time, in accordance with an aspect of the present disclosure.

FIG. 2 is a graph 40 illustrating issues with traditional performance testing of content players. As described herein, the player system 16 may be updated with streaming algorithms to fix bugs and improve streaming performance. To test an updated streaming algorithm, the player system 16 may playback video and/or audio fragments over a period of time 42 (e.g., days, weeks, months, years) to determine a percentage of sessions 44 with buffer underruns per day. For example, the updated streaming algorithm may be deployed to the player system 16 and tested over the period of time 42 in the normal mode 20. In certain instances, the streaming algorithm may determine a timing for downloading the video and audio fragments and a quality (e.g., bit rate) of the media fragments. The media fragments may be stored in a buffer of the player system 16 and the streaming algorithm may adjust a quality for downloading media fragments, which may impact performance of the video player. It may be understood that the bit rate may correspond to a quality of the media content. For example, a higher bit rate may correspond to a higher quality and a lower bit rate may correspond to a lower bit rate. By way of example, if the buffer level is above a threshold, the streaming algorithm may maintain or increase the quality, but if the buffer level is below a threshold, the streaming algorithm may decrease a quality to attempt to fill the buffer faster than data is removed from the buffer for playback. A buffer underrun may occur when an amount of video and audio fragments entering the buffer occurs at a lower rate in comparison to an amount of video and audio fragments is leaving the buffer to be displayed on the player system 16, causing the buffer to empty below a critical threshold set by the streaming algorithm and/or below an amount of data needed to facilitate playback of the content. As such, the content being displayed may be paused for a period of time until additional video and audio fragments enter the buffer. As such, quality of service provided by the player system 16 may decrease. It may be beneficial to performance test the player system 16 for multiple days or weeks to obtain a robust sample set and assess the performance of the player system 16. As such, performance testing may be time-consuming and resource intensive.

With the foregoing in mind, the graph 40 illustrates the player system 16 playing back video and audio fragments in three different bit rates (e.g., quality) during the normal mode 20. For example, the quality may include a standard definition (SD) 46, a high definition (HD) 48, and/or an ultra-high definition (UHD) 50. A number of buffer runs per day may be recorded over the period of time 42. In certain instances, the performance testing may be recorded over several days, weeks, or months to obtain a robust sample size of the performance of the streaming algorithm.

At point 54, an update (e.g., modification) to the streaming algorithm may decrease the percentage of sessions 44 with buffer underruns. For example, changing one or more parameters of the streaming algorithm may decrease the percentage of sessions 44 with buffer underruns. After releasing the updated streaming algorithm, the percentage of sessions 44 with buffer underruns may decrease by up to ⅔. However, as described herein, to test the updated streaming algorithm, the player system 16 may implement the updated algorithm. Then, the updated algorithm may be tested over a period of time 42 to determine the percentage of sessions with buffer underruns. In other words, performance feedback from updating the streaming algorithm may be measured in a production environment after modifications have been deployed to production, causing undesirable quality of experience until problems are observed, diagnosed, and mitigated in a subsequent modification (e.g., at point 54). Accordingly, it may be beneficial to decrease the period of time needed to performance test the streaming algorithm.

It may be understood that different content players and different configurations of the content players may result in different streaming metrics. For example, different types of player system(s) 16 may have different download capabilities. In another example, a distance between the player system 16 and a server may impact a download speed of the video and audio fragments, thereby impacting quality of service. As further described with respect to FIG. 6, a variety of historical data may be collected for different types of player system(s) 16 and/or different networks.

Figure 3:
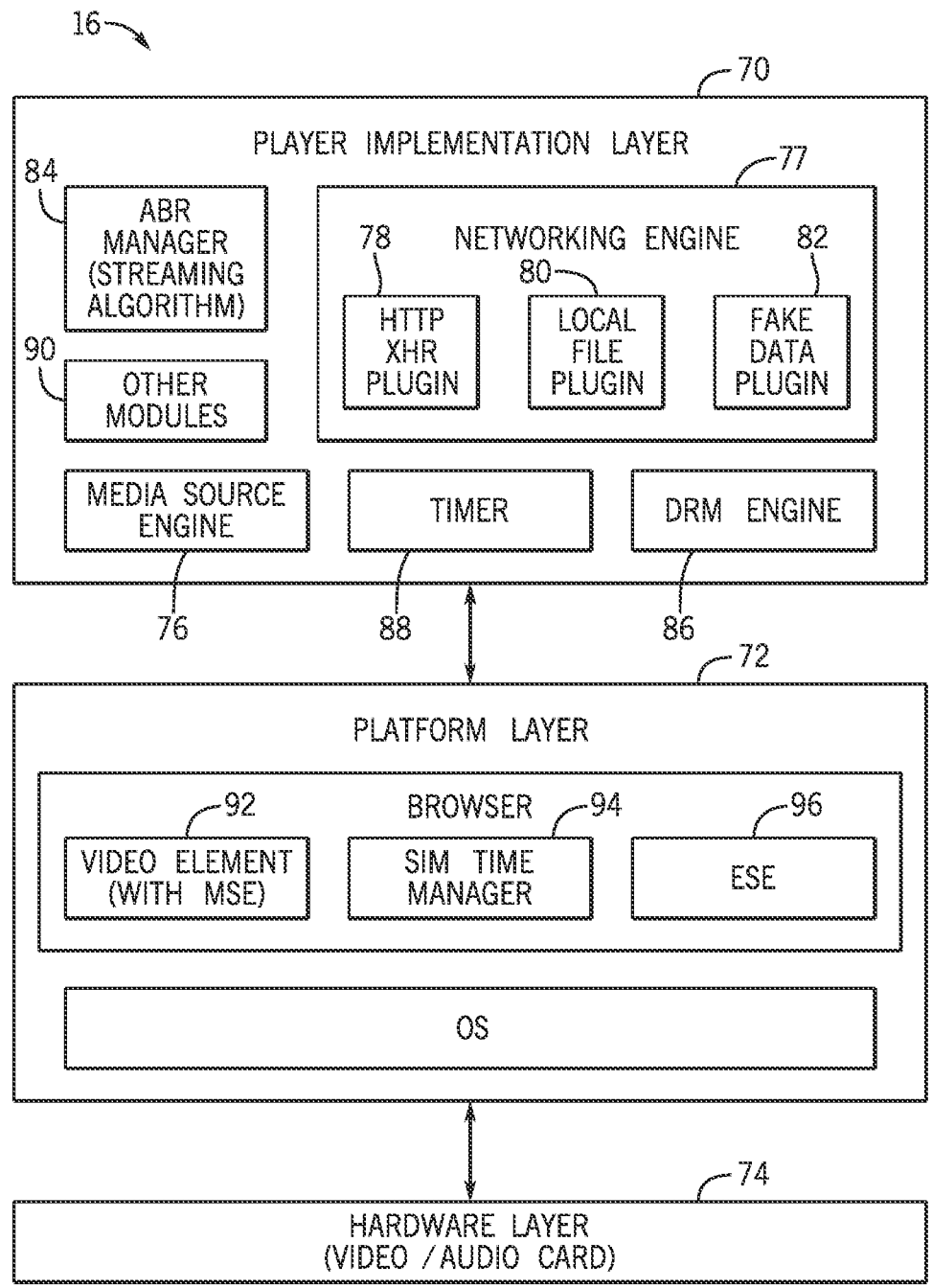
FIG. 3 is a block diagram of the player system of FIG. 1, in accordance with an aspect of the present disclosure.

FIG. 3 is a schematic diagram of the player system 16. As discussed herein, the player system 16 may operate in two modes, such as the normal mode 20 and the simulation mode 18. When operating in the normal mode 20, the player system 16 may operate using the streaming algorithm and playback media fragments over a period of time. When operating in the simulation mode 18, the player system 16 may operate using the modified streaming algorithm and may not playback the media fragments. Advantageously, code (e.g., streaming algorithm) may be shared between the streaming algorithm and the modified streaming algorithm. In this way, more code may be tested; and in certain instances, the code may be implemented in the normal mode 20 (e.g., production) immediately after testing in the simulation mode 18. As such, performance of the player system 16 in the normal mode 20 may closely match the performance of the player system 16 in the simulation mode 18, thereby improving quality of the content playback.

To implement the two modes, the player system 16 may include a player implementation layer 70, a platform layer 72, and a hardware layer 74. The player implementation layer 70 may include the streaming algorithm. The player implementation layer 70 may also cause the player system 16 to operation in either the normal mode 20 or the simulation mode 18. The platform layer 72 may receive the video and audio fragments for operation in the normal mode 20, and the hardware layer 74 may display the media content in the normal mode 20.

As illustrated, the player implementation layer 70 may include a media source engine 76 to implement the two modes of operation (e.g., normal mode 20, simulation mode 18). The media source engine 76 may receive a user indication to operate in either the normal mode 20 or the simulation mode 18. The networking engine 77 may include an HTTP XHR plugin 78 retrieve video and audio fragments via HTTP XHR requests or a Local File Plugin 80 to retrieve data from previously downloaded files for offline playback. When operating in the normal mode 20, the player system 16 may send a request to the HTTP XHR plugin 78 retrieve video and audio fragments. For example, the media source engine 76 send a request to an HTTP XHR plugin 78 retrieve video and audio fragments via HTTP XHR requests or a Local File Plugin 80 to retrieve data from previously downloaded files for offline playback. In response to receiving a video and audio fragment, the media source engine 76 implement a change content decryption operation and a content push operation. The change content decryption operation involves decrypting the video and audio fragments and the content push operation involves pushing one or more video and audio fragments to the hardware layer 74 for playback on the player system 16.

The networking engine 77 may also include the Fake Data Plugin 82 used in the simulation mode 18 for testing. For example, in the testing mode, the media source engine 76 may not perform the content decryption operation and the content push operation. The media source engine 76 may request historical streaming data from the database 24 and identify one or more events for performance testing. That is, video and audio may not be played back during performance testing, as such the content decryption operation and the content push operation may not be needed. The media source engine 76 may cause a Fake Data Plugin 82 to allocate a buffer with size the same as the number of bytes in the content request. In certain instances, the Fake Data Plugin 82 does not fill the buffer and then returns the buffer as a response to a request at the time determined by requested data size and network speed. In other instances, the Fake Data Plugin 82 fills the buffer with random or predefined data and returns the buffer as the response to the request at the time determined by requested data size and network speed. In the simulation mode 18, the Fake Data Plugin 82 may not retrieve video fragments because audio or video playback is not occurring. The Fake Data Plugin 82 may be used for testing modifications to the streaming algorithm. As further described herein, identifying one or more events may decrease an amount of time for performing the quality of service testing.

The platform implementation layer 70 may include an adaptive bit rate (ABR) manager 84 with the streaming algorithm or the modified streaming algorithm. The ABR manager 84 may determine when to change a bit rate (e.g., video quality). As described herein, the quality of the media content may be downloaded and delivered in SD, HD, and UHD. However, the video quality may be delivered in any suitable format. For example, the ABR manager 84 may encode and provide video fragments over the HTTP XHR Plugin 78 in UHD. In another example, the ABR manager 84 may adjust the bit rate based on the buffer level or a number of video and audio fragments within the buffer. In an embodiment, the ABR manager 84 may adjust a streaming format (e.g., resolutions, color/brightness rangers, and/or frame rates) based on characteristics of the buffer.

The platform implementation layer 70 may also include a direct rendering manager (DRM) engine 86, a timer 88, and one or more other modules 90. As further described herein, the DRM engine 86 may receive one or more license requests in the normal mode 20. In the simulation mode 18, the timer 88 may receive one or more time ticks to advance time from the platform layer 72. The player system 16 may also include one or more other modules 90 for implementing the streaming algorithm, the modified streaming algorithm, switch between the two modes of operation, and the like.

The platform layer 72 may include a browser or an operating system for implementing the platform implementation layer 70. For example, the platform layer 72 may include a video element 92 with a media source engine. The video element 92 or a proxy of video element implemented based on an existing open source implementation. The video element 92 may be either a browser or another audio and video module that may implement the streaming algorithm. If browser code available, then the video element 92 may implement the streaming algorithm, otherwise a proxy of the video element 92 may be implemented based on existing open source implementation.

A simulation time manager 94 may be implemented in the platform layer 72 to provide time management to the timer 88 within the player implementation layer 70. The simulation time manager 94 may have two modes of operation. In this way, the normal mode 20 and the simulation mode 18 may be implemented within the player implementation layer 70. For example, the simulation time manager 94 may generate simulation time ticks at a rate proportional to a real world wall clock rate. When operating in the normal mode 20, the timer 88 may accept real hardware clock ticks to advance time. In another example, the simulation time manager 94 may determine that all operations for a current tick have been processed, then advance to a next tick. In the simulation mode 18, the timer 88 may accept software simulation time ticks to advance time, enabling the simulation to run faster. For example, one tick may be equivalent to 100 nanoseconds (ns). Within a particular second, if there are no events to handle, then the simulation time manager 94 may rapidly generate ticks to advance the media content forward 1 second in less than 1 microsecond. If there are events to be processed within a second, then the speed at which the player system 16 may process the event may determine when the simulation time manager 94 may advance the tick. For example, events that may include downloading a video fragment, or the timer 88 expiring after a predefined time interval. In this way, simulation testing may be rapidly performed.

In certain instances, a timer implementation within a video element of a browser source code may be available. As such, the simulation time manager 94 may implement the two modes of operation within the browser source code. In other instances, browser source code may not be available, but a proxy of video content may be available. In this case, the simulation time manager 94 may implement the two modes of operation within the proxy.

The platform layer 72 may also include the encrypted media extensions (EME) 96. When operating in the normal mode 20, the EME 96 may decrypt video or audio fragments for display on the player system 16. The EME 96 may send a license request to the DRM engine 86 and handle license requests. In the simulation mode 18, video fragments may not be used, as such there may not be data to decrypt and the EME 96 may not issue license requests to the DRM engine 86.

It may be understood that components of the player system 16 are merely exemplary and may include more or less components than illustrated. Furthermore, one or more components of the player system 16 may be combined. For example, the HTTP XHR Plugin 78 may be combined with the Local File Plugin 80.

Figure 4:
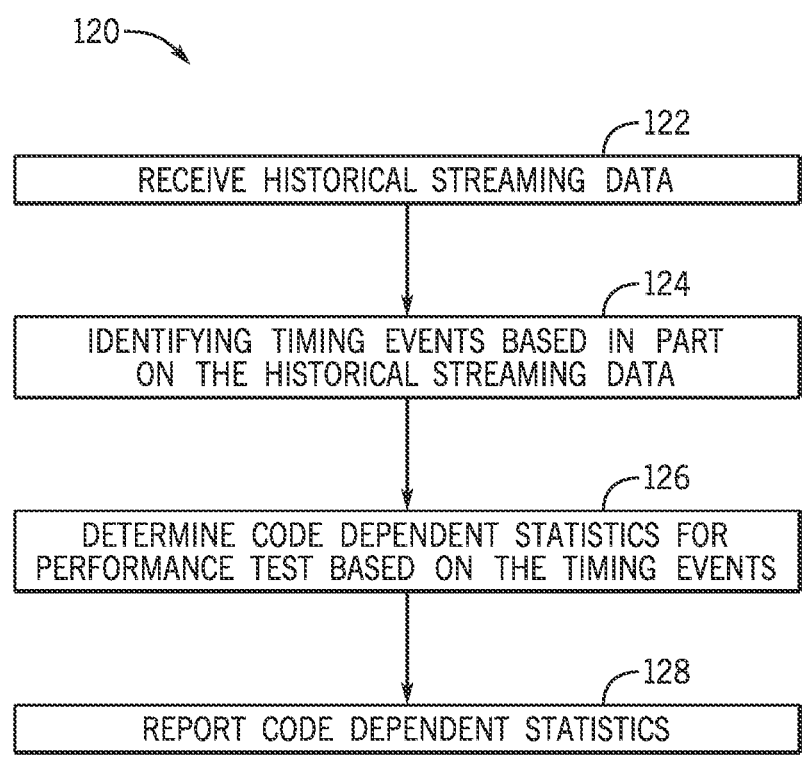
FIG. 4 is a flowchart of a process for evaluating streaming algorithms via the player system of FIG. 1, in accordance with an aspect of the present disclosure.

FIG. 4 is a flow chart illustrating a process 120 for evaluating a modified streaming algorithm with the player system 16. As described herein, the player system 16 may generate streaming statistics (e.g., user data) over a period of time in the normal mode 20. The streaming statistics (e.g., historical streaming data) may be stored in the database 24 and used for performance testing. Prior performance testing in the simulation mode 18, the player system 16 may receive the modified streaming algorithm that may be different from an implemented streaming algorithm (e.g., implemented in the normal mode 20). Advantageously, the player system 16 may implement the modified streaming algorithm, identify one or more events within the historical data, and performance test the modified streaming algorithm without video or audio playback and/or download (e.g., of at least a portion of the content stream). In this way, the amount of time needed to complete performance testing of the modified streaming algorithm may be reduced, the number of tests that may be performed can be increased, and data processing may be greatly improved (e.g., by reducing an amount of data actually downloaded for testing). While the process 120 is described using steps in a specific sequence, additional steps may be performed, the described steps may be performed in different sequences than the sequence illustrated, and/or certain described steps may be skipped or not performed altogether.

At block 122, the player system 16 may receive and/or retrieve historical streaming data. For example, the player system 16 may retrieve the historical streaming data from the database 24 or a backend server. When determining the historical streaming data used for performance testing, a number of code (or algorithm) independent statistics may be considered. The code independent statistics may include a network provider, a location of the content source(s) 22, a network speed, a type of content player, or the like. For example, components of the content player may affect a performance (e.g., download speed). In another example, a location of the servers of the content source(s) 22 may affect the network speed. As such, the historical streaming data generated by a similar type of content player as the player system 16.

At block 124, the player system 16 may identify one or more timing events that simulate player actions based on the historical streaming data. For example, the player system 16 may identify video and audio fragments to request (e.g., higher quality and/or lower quality versions) via bit rate manager events, simulated download finish events of video and audio fragments based upon the historic network characteristics and/or conditions via a streaming engine update event, dynamic simulated buffer levels based upon simulated playback finish events and simulated download finish events, or the like. As described herein, the player system 16 may not playback the video or audio fragments; instead, the player system 16 may determine timing information related to the video or audio fragment request submission and arrival of the fragments via the network based on historical network speed data at corresponding time.

At block 126, the player system 16 may determine one or more code dependent statistics for performance testing based on the one or more timing events. For example, code dependent statistics may include the buffer level, a number of buffer underruns, amount of time the playback occurred in SD, HD, and UHD, or the like. The player system 16 may implement the modified streaming algorithm based on the historical streaming data. The player system 16 may process the first timing event based on the historical network speed to determine the buffer level. After processing the first timing event, the player system 16 may receive a second timing event and process the event based on the historical network speed, and so on until each timing event is processed. In an instance, the simulation time manager 94 may advance the timer 88 after each timing event is completed. As such, time and resources needed for performance testing may be reduced.

At block 128, the player system 16 may report at least a subset of the code dependent statistics and/or performance data derived from the code dependent statistics. For example, after processing each timing event, the player system 16 may adjust (or simulate adjusting) a buffer level. In certain instances, the buffer level may reach zero, which may be indicative of a buffer underrun. As such, the player system 16 may also track of a number of buffer underruns, which may be reported (e.g., via a graphical user interface dashboard). Further, ratios of time spent in particular versions of content (e.g., HD vs. UHD), etc. which may be derived from the code dependent statistics, may be reported. The streaming algorithm may be modified after each performance test to fine-tune one or more parameters to reduce or eliminate buffer underruns. Using timing events identified using the historical network speed profile allows performance testing to be completed without data transfer over the network, without playback of video or audio, and without deployment to production. As such, time and resources needed for performance testing may be reduced.

Figure 5:
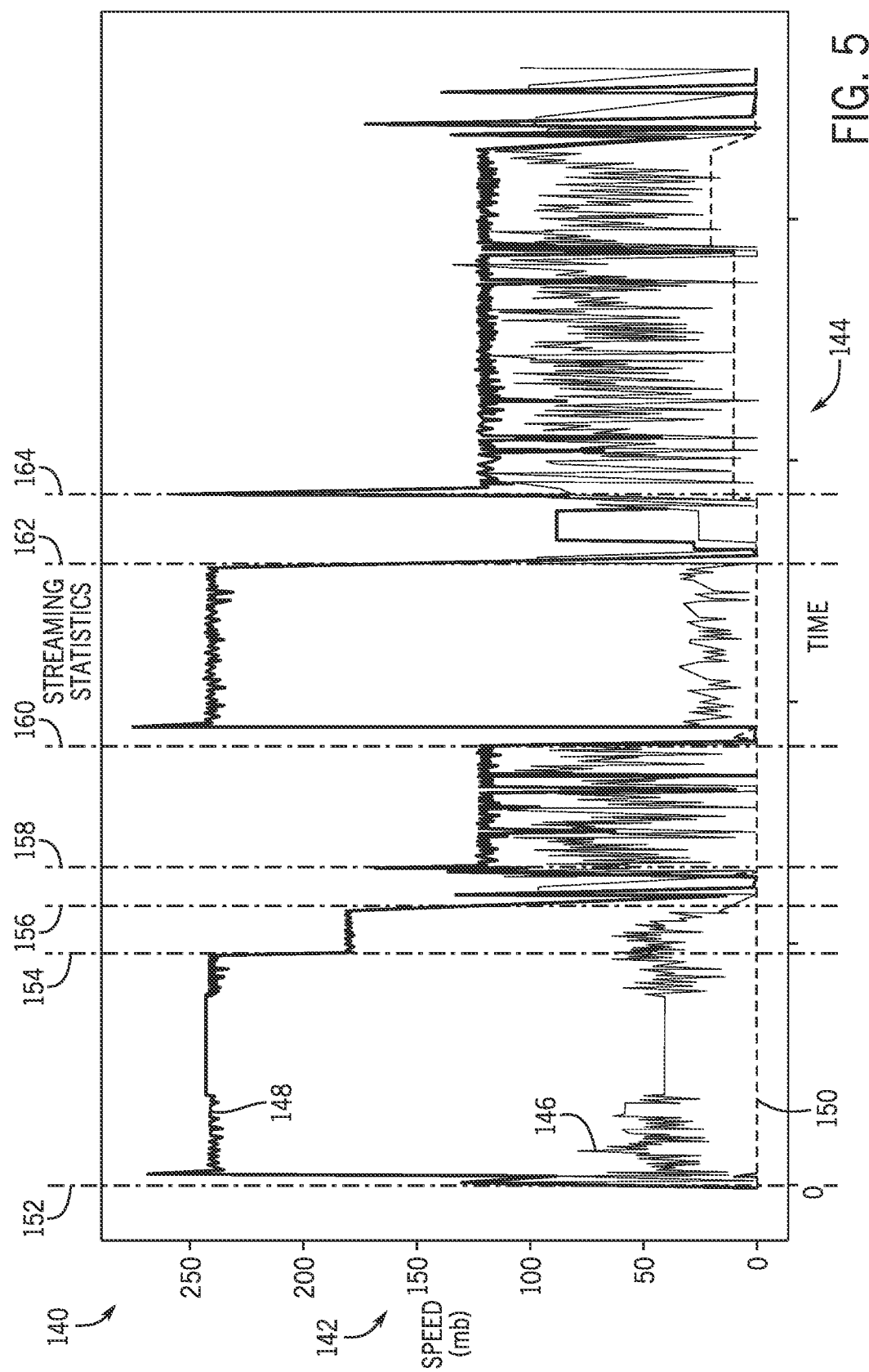
FIG. 5 is a graph illustrating streaming statistic changes and associated network variability over time, in accordance with an aspect of the present disclosure.

FIG. 5 illustrates a graph 140 illustrating the historical streaming data generated during the normal mode 20 and used during the simulation mode 18 for performance testing. The graph 140 may illustrate a network bandwidth/speed 142 observed in megabits (mb) over time 144 in seconds (s). For example, the graph 140 illustrates a specific instance of a network speed profile 146 in megabytes per second (mbps) observed by a real content player. Further, to illustrate the dependent relationship to the network speed profile 146, a buffer level 148 and buffer underruns 150 observed at corresponding times are also illustrated.

At point 152, the player system 16 may download one or more media fragments to fill the buffer (e.g., increase the buffer level 148). Once the buffer level 148 is above a threshold level, playback may occur. The network speed 142 may be adequate for the player system 16 to keep the buffer level 148 high, as such there may not be significant buffer depletion.

At point 154, the network speed 142 may decrease causing the buffer level 148 to decrease. In other words, video and audio fragments may be leaving the buffer quicker than video and audio fragments may be entering the buffer. As the network speed 142 continues to drop, at point 156, the buffer level 148 may decrease to zero. When the buffer level 148 reaches zero, the player system 16 may temporarily pause playback and fill the buffer. As such, one buffer underrun 150 may occur at point 156. In an instance, the streaming algorithm may decrease a bit rate to quickly refill the buffer. For example, the streaming algorithm may implement or choose a lowest (or lower) bit rate to fill the buffer in a shortest amount of time.

At point 158, the network speed 142 may increase and, thus, the buffer level 148 may also increase. As such, the player system 16 may resume playback. The buffer level 148 may remain stable until point 160. Again, a decrease in network speed 142 may result in the buffer level 148 depleting, eventually reaching zero and, thus, causing a second buffer underrun 150.

Between points 160 and 162, the network speed 142 may be relatively low, but the buffer level 148 may be high. In certain instances, this may occur because the streaming algorithm may decrease the quality of fragments requested to quickly fill the buffer. As such, playback may be maintained on the player system 16.

At point 162, the network speed 142 may be unstable, resulting in a third buffer underrun 150. At point 164, the network speed 142 and the buffer level 148 may increase.

When operating in the simulation mode 18, the player system 16 may use the network speed profile 146 to determine the buffer level 148 and the number of buffer underruns 150 for subsequent simulated playbacks of streaming content. In this way, performance testing may be completed without playing back video and audio fragments.

By way of example, the player system 16 may select a user's playback session for which historical streaming data was collected. In certain instances, the historical streaming data selection may be determined based on code independent statistics, such as a type of content player, a type of media content, a server provider, or the like. For performance testing, the Fake Data Plugin 82 may use the network speed profile 146 extracted from the historical data to determine simulated timing events for a simulated playback. For example, the Fake Data Plugin 82 may determine timing events for requesting one or more video and audio fragments. For example, at point 152 after receiving the request to download a 5 megabyte (MB) video or audio fragment, the network speed 142 was 16 mbps (2 MB/s) for 2 seconds, then stayed at 8 mbps (1 MB/s) for 6 seconds. As such, the Fake Data Plugin 82 may determine that a 5 MB video or audio fragment may be downloaded 3 seconds after receiving this request.

As may be appreciated, it may be less desirable to use a real network plugin, as such use may utilize a network shaper to shape of the network speed to the extracted network speed profile 146. In this case, the modified streaming algorithm may not be tested as quickly since download speed may dictate an amount of time needed for performance testing. In this way, the performance impact of the modified streaming algorithm may not be tested thoroughly within the same amount of testing time as other cases. However, this performance testing may not be limited by the hardware layer 74 (e.g., video card) and multi-threading with multi-core may be used to speed up the performance testing.

FIG. 6 illustrates multiple graphs 170 illustrating historical streaming data collected from one or more player system (s) 16, resulting in numerous network profiles which can be selected from to implement the content player simulation performance analysis described herein. For example, the historical streaming data may be collected from thousands of player system(s) 16 per day. The streaming data may differ from one type of player system (e.g., content player) 16 to another type of player system 16. As such, the historical streaming data may capture different network profiles, different code dependent statistics, code independent statistics, or a combination thereof. The historical streaming data may include streaming statistics collected at the client side and stored in backend server logs. The historical streaming data may also be stored in the database 24.

Code independent statistics may include a type of player, a network service provider, a platform, a server location, and a network speed profile. For example, the network service provider may adjust the network speed. In another example, a distance between the server location and player system 16 may affect the download time of the video and audio fragments. That is, a larger distance between the server location and the player system 16 may increase the download time of the video or audio fragments in comparison to a smaller distance. Still, the platform (e.g., consumer media view devices, web browser) for implementing the streaming algorithm may influence the performance of the player system 16. As illustrated, the historical streaming data may differ based on each of the code independent statistics.

When operating in the simulation mode 18, player system 16 may use the historical streaming data to determine one or more timing events. For example, the player system 16 may determine a timing for downloading video and audio fragments during the playback session based on the historical network speed profile data. The player system 16 may obtain the historical streaming data and create a simulation timeline, such as the timeline described with respect to FIG. 7, with an event queue comprising a series of timing events.

Figure 7:
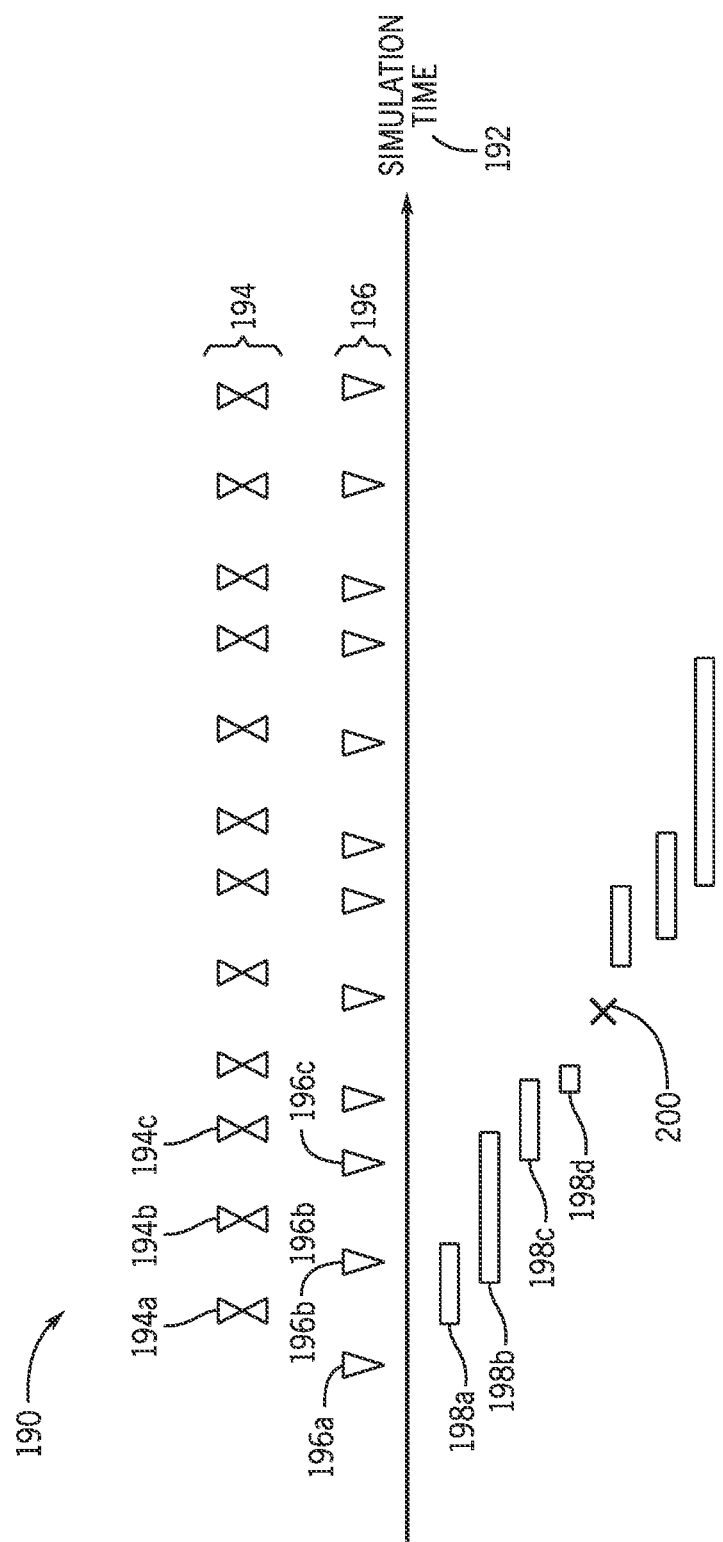
FIG. 7 is a graph illustrating an example of streaming algorithm evaluation via the player system of FIG. 1, in accordance with an aspect of the present disclosure.

With the foregoing in mind, FIG. 7 illustrates a graph 190 of the player system 16 operating in the simulation mode 18 and performance testing the modified streaming algorithm over a simulation time 192. As described herein, the simulation time 192 may be shorter than the actual video and audio playback time for a particular piece of content, as the player system 16 need not download all fragments of content nor actually playback the streamed content, enabling process timing to occur much more rapidly with far less computing resources. For example, the player system 16 may identify a playback event and decrease the buffer level or a download finish event to increase the buffer level. Additionally or alternatively, the player system 16 may identify a bit rate manager event and determine a quality of a subsequent media fragment and/or a streaming engine event and determine a time point for sending a request of downloading the subsequent fragment. For example, the player system 16 may identify when video fragments have been downloaded at various times based on the historical streaming data. The player system 16 may also determine if content is being buffered, a time when media content is being played back, and if content is being redownloaded and buffered at various times. Unlike a real playback session (e.g., normal mode 20), the player system 16 does not wait for video and audio fragments to be downloaded in the simulation mode 20, rather based on the historical network speed profile and a size of the media fragment, it determines an amount of time needed to download the media fragment. Then, the player system 16 may advance the simulation timeline. In this way, the player system 16 may receive the timing event and process the event based on the historical streaming data to determine the buffer level. In this way, the player system 16 may quickly determine if and when a buffer underrun may occur under the given network conditions and the modified streaming algorithm.

As illustrated, the timeline includes timing events 194, download finish events 196, and a simulated buffer level 198. The timing events 194 may be determined by the simulation time manager 94 and represent simulated fragment download durations. The download finish events 196 may represent a completed download based on the network speed profile within the historical streaming data. The player system 16 may identify the download finish events 196 based upon the historical network speed profile data and fragment sizes identified by the versions of content fragments to download (e.g., as dictated by the adaptive bit rate manager). This information may be used to determine a buffer level 198. For example, as may be appreciated, download finish events may increase the buffer level, as the downloaded data would add to information in the buffer, while playback finish events may reduce the level of the buffer, as the playback consumes data from the buffer. Based upon these events, the buffer level 198 may be calculated without actually downloading and/or playing back content.

By way of example, the player system 16 may initiate a first download finish event 196a and receive a first timer event 194a and determine an amount of time needed to download a media fragment. For example, the first timer event 194a may occur at time t=0. The player system 16 may determine actions performed during normal mode 20 at time t=0, such as downloading the media fragment, determining a network profile, determining a size of the media fragment, and so on. Based on the media fragment size and the network speed profile at time t=0, the player system 16 may determine an amount of time needed to download the media fragment. For example, if the media content is 10 mb and the network speed profile is 10 mbps, then the player system 16 may determine that 1 second is needed to download the media fragment.

As such, a second download finish event 196b may occur at time t=1 second. As described herein, the player system 16 does not playback video or audio during operation in the simulation mode 18, rather events along the simulation timeline may be associated with a time within the historical streaming data to identify a simulated download and/or playback finish of particular fragments. The player system 16 may also increase the buffer level 198a to an amount equivalent to the first downloaded media fragment. The player system 16 may then receive second timer event 194b, determine an amount of time to download a subsequent media fragment, and identify a third download finish event 196c, and increase the buffer level 198b. This process may continue until the player system 16 determines the buffer level is at or above a starting threshold and a playback event may occur.

During playback, the buffer level 198 may decrease as media fragments are leaving the buffer to be displayed on the player. For example, at the third timer event 194c, the player system 16 may receive indication to perform a playback event. The player system 16 may determine an amount to adjust the buffer level 198c based on the media fragment leaving the buffer for simulated playback based on the network profile speed at a time associated with the playback event. For example, the player system 16 may raise the buffer level upon a download finish event and/or lower the buffer level upon determining a playback event.

In certain instances, the media fragments may leave the buffer at a rate faster than media fragments entering the buffer. For example, if the network speed indicated in network speed profile decreases at an associated time in the simulation, then the amount of time needed to download the media fragment may increase. However, the rate at which media fragments leave the buffer may remain unchanged. As such, the buffer level may be depleted. If the player system 16 determines that the buffer does not include any media fragments for playback, then the player system 16 may issue a buffer underrun event 200. The player system 16 may pause playback to refill the buffer. As illustrated by the graph 190, the player system 16 may receive three timing events simulating downloading subsequent media fragments and four download finish events simulating refilling the buffer.

The player system 16 may receive a modified streaming algorithm that may be different from the streaming algorithm implemented during the normal mode 20 for performance testing. The modified streaming algorithm may include one or more parameters for the buffer level 198, such as a buffer goal (e.g., an amount of seconds the player will try to buffer), a buffer behind (e.g., an amount of seconds of content we need to keep in the buffer behind the playhead), and a rebuffer goal (e.g., an amount of content we have to have buffered before we can start playing). The modified streaming algorithm may also identify one or more thresholds for various buffer levels. For example, the buffer level 198 may include a critical level, a warning level, and a safe level. When the buffer level 198, hits a designated threshold level, the ABR manager 84 may adjust a bit rate, thereby adjusting the buffer level. For example, if the buffer level reaches the warning level, the ABR manager 84 may lower the bit rate such that the buffer level may increase to the safe level. In certain instances, the buffer level 198 may go below the critical level and the player system 16 may issue a buffer underrun event 200, where the buffer level is so low that playback pauses.

As such, the player system 16 may performance test a modified streaming algorithm using the historical streaming data, collecting code dependent statistics during simulation. Accordingly, the modified streaming algorithm may be performance tested prior to product deployment. As such, the video player may quickly evolve and a better quality of service may be provided to the customer.

Figure 8A:
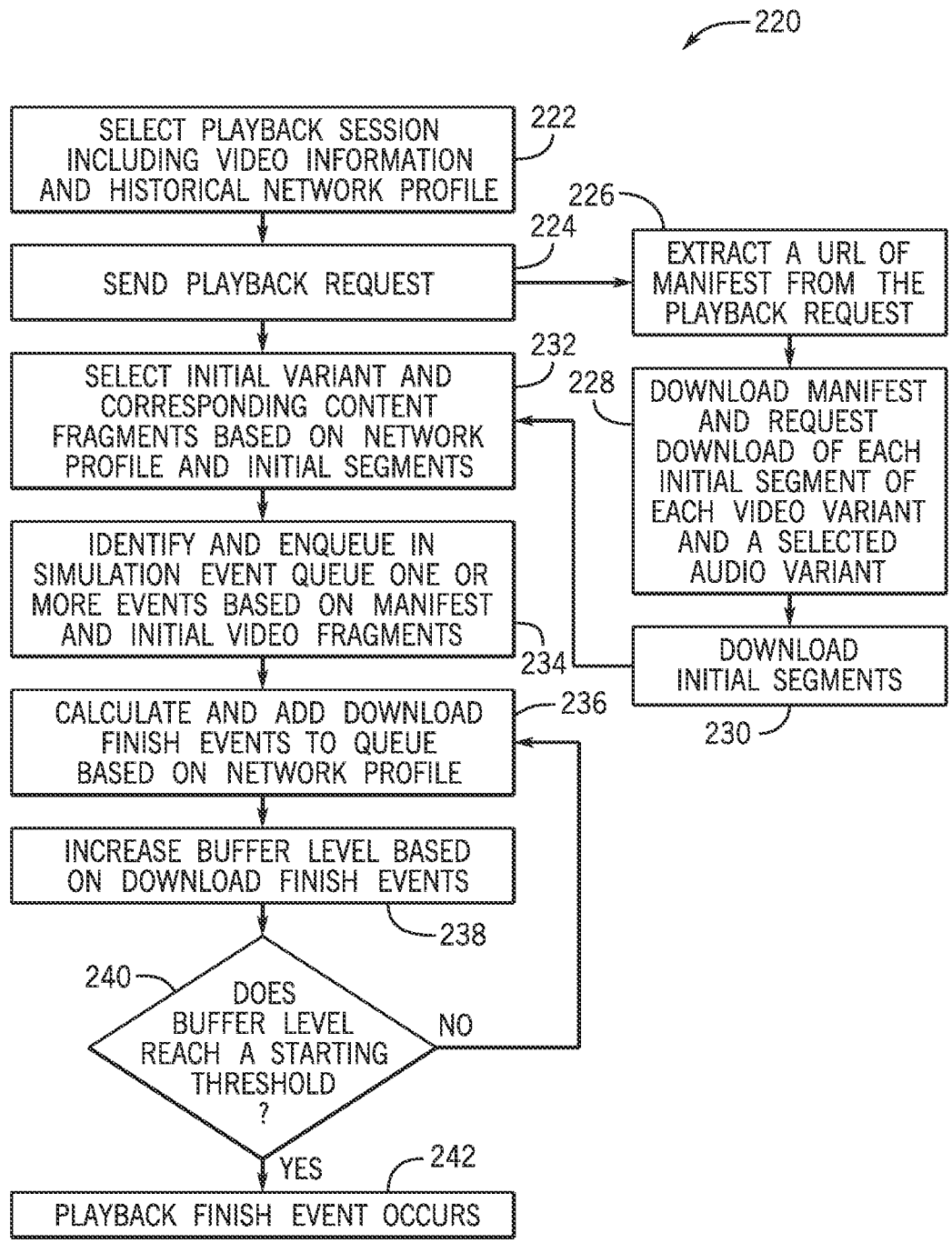
FIG. 8A is a flowchart of a process for setting up testing via the player system of FIG. 1, in accordance with an aspect of the present disclosure.

FIG. 8A is a flowchart of a process 220 for setting up the player system 16 for operation in the simulation mode 18. In other words, the player system 16 may for performance test the modified streaming algorithm during the simulation mode 18. In certain instances, code (e.g., streaming algorithm) may be shared between the two modes of operation (e.g., simulation mode 18, normal mode 20) and additional code may be tested during the simulation mode 18. As such, code deployed in the normal mode 20 may closely match code tested by during the simulation mode 18. For example, the player system 16 may receive or retrieve the historical streaming data and identify one or more events for performance testing. Based on the historical streaming data, the modified streaming algorithm may monitor a buffer level and change a bit rate. After operation in the simulation mode 18, simulation statistics may be outputted. While the process 220 is described using steps in a specific sequence, additional steps may be performed, the described steps may be performed in different sequences than the sequence illustrated, and/or certain described steps may be skipped or not performed altogether.

At block 222, the player system 16 may select a playback session including video information and historical network profile. For example, the historical streaming data may include information for one or more video and audio fragments, such as a size, a quality, a length, and so on. Additionally or alternatively, the player system 16 may extract the historical network profile (e.g., speed time series data) from the historical streaming data generated during operation in the normal mode 20. The player system 16 may select a playback session within a time period. For example, player system 16 may select from historical streaming data generated within the last week, data generated at a prescribed range of time corresponding to the simulation, data generated within a geographic area that is to be simulated, data generated by a similar type of content player, data generated by a similar platform to be simulated, etc.

At block 224, the player system 16 may send a playback request. For example, the player system 16 may send a request for historical streaming data associated with the playback. At block 226, the player system 16 may extract a URL of a manifest from the playback request.

At block 226, the player system 16 may download the manifest and request download of each initial segment of each video variant and a selected audio variant. For example, the player system 16 may operate in the normal mode 20 to download the manifest and the initial segments. Then, the player system 16 may switch operation back to the simulation mode 18. It may be understood that each variant of a video fragment corresponds to a video bit rate or a video quality. A higher bit rate may correspond to a higher video quality, while a lower bit rate may correspond to a lower video quality. For example, a video variant correspond to a SD video fragment, an HD video fragment, a UHD video fragment and so on, and an audio variant may mean a SD audio fragment, an HD audio fragment, a UHD video fragment, and so on. Additionally or alternatively, the player system 16 may select a variant out of one or more audio variants because the audio data size may be much smaller than the video data size. As such, the audio variant may remain consistence throughout the simulation session. Returning to the manifest, the manifest may define the parameters and description for streaming the video and audio fragments. For example, the manifest may include bit rate information for one or more video fragments. The manifest may include one or more uniform resource identifiers (URIs) and names for the streamed media content. When operating in the normal mode, the manifest may also include DRM data.

After the manifest is downloaded, the player system 16 may issue a request to download the initial segments. The initial segment may include information needed to retrieve subsequent video fragments. For example, the initial segments may include a starting byte index, a number of bytes in the video fragment, a time duration of the video fragment, and other information for downloading subsequent video fragments.

At block 230, the player system 16 may download the initial segments and utilize the initial segments in the simulation mode 18. At block 232, player system 16 may select an initial video variant and corresponding content fragments based on the network profile and the initial segments. Additionally or alternatively, the player system 16 may select the initial video variant based on an amount of data downloaded and the network speed profile. After actually downloading the manifest and the initial segments, the simulation may begin, and the player system 16 may choose to start the performance testing from a beginning of the media content or from a predetermined time period. For example, the player system 16 may start the media content from the beginning to generate robust statistics. In another example, the player system 16 may have paused simulation testing and therefore, may restart simulation testing at predetermine time period.

At block 234, the player system 16 may identify and enqueuer in the simulation event queue one or more events based on the manifest and initial video fragments.

At block 236, the player system 16 may calculate and add download finish events to queue based upon network profile. The player system 16 may download a video fragment based on the historical streaming data. For example, the player system 16 may use the historical streaming data and a size of the first video fragment to determine a period of time needed for download. In another example, the network plugin of the player system 16 may receive a first non-initial segment request and determine a period of time duration needed to finish downloading the first non-initial fragment. Then, the player system 16 may place the event into the simulation event queue. After the player system 16 requests to download the non-initial segments, the network plugin may queue a download finish event and the download finish event may occur. For example, the player system 16 may send one or more video fragment requests to the network plugin. Based on the historical data, the player system 16 may determine an amount of time taken to download all initial segments during the normal mode 20 and map the amount of time to a time t=t3. Then, the player system 16 may determine the network speed at time t=t3 for mapping subsequent events.

At block 238, the player system 16 may increase (e.g., simulate increasing) buffer level based on download finish events. The player system 16 may increase the buffer level. For example, the player system 16 may increase the buffer level by one video fragment. In another example, the player system 16 may increase the buffer level to a size (e.g., bit) of the downloaded video fragment. Still in another example, the player system 16 may increase the buffer level according to non-initial segment information recorded in the download finish event.

At decision block 240, the player system 16 may determine if the buffer level reaches a starting threshold. The buffer level may be determined by user input or the modified streaming algorithm. For example, the user may set a minimum number of video fragments prior to playback. In another example, the player system 16 may determine a minimum buffer level needed before beginning playback. In another example, parameters of the modified streaming algorithm (e.g., ABR manager 84) may determine the buffer level from historical streaming data.

If the buffer level does not reach the starting threshold, then the process may return to block 236 to calculate and add additional download finish events to queue based on network profile and block 238 to increase the buffer level based on download finish events. If the buffer level (e.g., video buffer, audio buffer) reaches a starting threshold, a playback event may occur (e.g., starting a playback), at block 242. In this way, the player system 16 may create the simulation timeline described with respect to FIG. 7.

If the buffer level does reach the starting threshold, the player system 16 may process a playback finish event, signifying a time when playback of a fragment (e.g., the fragment with simulated playback at block 242) finishes. The playback finish event may simulate playback by the player system 16 in the normal mode 20. The player system 16 may utilize the historical data to determine a media fragment played back during the normal mode 20 and remove the associated media fragment from the buffer level. In this way, the player system 16 may simulate playing back the video and audio fragments without playing the fragments back.

In another example, the player system 16 may identify a period of time needed to fill the buffer based on the historical streaming data, the manifest, and/or the initial segments. The player system 16 may use the network speed and a size of the initial segment to determine the period of time. Still in another example, the player system 16 sends fragment requests to its network plugin. From the historical streaming data, the player system 16 looks up the time when all initial segments were downloaded in the normal mode 20 and maps the time point to the historical streaming data for determining network speed for subsequent actions for operating in the simulation mode 18. To initialize the simulation event queue, the event (e.g., timing information, timer, bit rate manager update event) is placed into a format (e.g., event occurring time, event type, optional details) and placed in the simulation event queue (e.g., simulation event timeline).

Figure 8B:
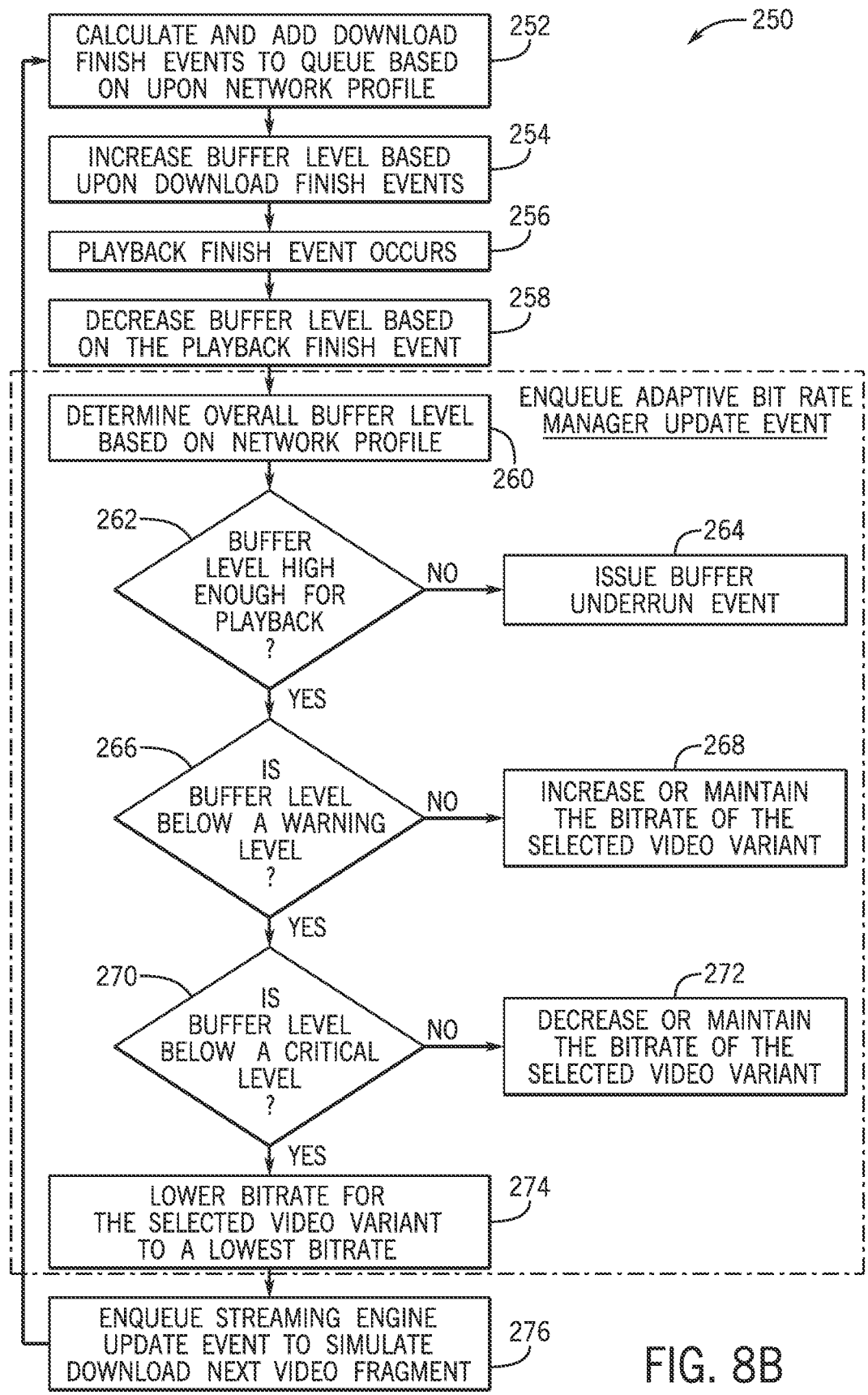
FIG. 8B is a flowchart of a process for testing the streaming algorithm via the player system of FIG. 1, in accordance with an aspect of the present disclosure.

FIG. 8B is a flowchart of a process 220 for setting up the player system 16 for operation in the simulation mode 18 and performance testing the modified streaming algorithm. For example, the player system 16 may receive the historical streaming data generated during the normal mode 20 and identify one or more events. Based on the historical streaming data, the player system 16 may monitor a buffer level and change a bit rate (as determined by the modified streaming algorithm implemented in the simulation mode 18). After the performance testing, simulation statistics may be outputted. While the process 220 is described using steps in a specific sequence, additional steps may be performed, the described steps may be performed in different sequences than the sequence illustrated, and/or certain described steps may be skipped or not performed altogether.

At block 252, the player system 16 may calculate and add download finish events to queue based on network profile similar to block 236. At block 254, the player system 16 may increase (e.g., simulate increasing) the buffer level based on download finish events similar to block 238. At block 256, the player system 16 may process a playback finish event similar to block 242.

At block 258, the player system 16 may decrease (e.g., simulate decreasing) the buffer level based on the playback event. For example, the playback finish event may simulate playing back a media fragment. The player system 16 may remove a media fragment from the buffer based on the historical streaming data and decrease the buffer level based on a size of the media fragment. For example, if player system 16 played back a 10 mb media fragment at a time t=t2 in the normal mode 20, then the player system 16 may remove the 10 mb media fragment from the buffer at time t=t2 om the simulation mode 18.

Based upon the buffer changes, a bit rate manager update event may occur (block 259). For example, the ABR manager 84 described with respect to FIG. 3 may perform a bit rate change based on the buffer level. By way of example, the streaming algorithm may include three buffer levels, which may determine a bit rate increase or a bit rate decrease. The buffer levels may include a safe level, a warning level, and a critical level. The buffer levels may be a range or a percentage. For example, the safe level may be 66% to 100% full, the warning level may be 33% to 65% full, and the critical level may be 0% to 32% full. In another example, the safe level may include 10 or more video fragments, the warning level may be 4 to 10 video fragments, and the critical level may be 4 or less video fragments.

At block 260, the player system 16 may determine the overall buffer level based on the network profile. As described herein, the player system 16 may determine an amount of time needed to download the media fragments based on the extracted network profile from the historical streaming data. The player system 16 may also determine the overall buffer level based on the network profile from the historical streaming data by processing one or more download finish events. The player system 16 may also compare the overall buffer level to the safe level, the warning level, and/or the critical level to determine if the bit rate may be adjusted.

At determination block 262, the player system 16 may determine if the buffer level is high enough for playback. If the buffer level is not high enough for playback, then the player system 16 may issue a buffer underrun event at block 264. For example, if the buffer is depleted, there may not be enough media fragments for playback, as such the streaming engine may pause the playback and buffer. In this way, the buffer may refill and the buffer level may increase.

If the buffer level is high enough for playback, then at determination block 266, the player system 16 may determine if the buffer level is below a warning level. If the buffer level is not below a warning level, then at block 268, the player system 16 may increase or maintain the bit rate of the selected video variant. For example, the ABR manager 84 may include the modified streaming algorithm and determine that the current overall buffer level is above the safe level and below a maximum buffer level. The ABR manager 84 may set the next video fragment to download to a quality higher than the current quality. For example, the ABR manager 84 may increase the quality for the subsequent video fragment from SD to HD or from HD to UHD. In another example, the ABR manager 84 may determine that the bit rate is a highest quality, as such the ABR manager 84 may maintain the quality for the subsequent video fragment.

If the buffer level is below the warning level, then at determination block 270, the player system 16 determine if the buffer level is below a critical level. If the buffer level is not below a critical level, then at block 272, the player system 16 may decrease or maintain the bit rate of the selected video variant. For example, the ABR manager 84 may determine that the overall buffer level (e.g., audio buffer level and video buffer level) is below the safe level and set the quality of the next video fragment to be lower than the current quality. For example, the ABR manager 84 may decrease the quality from UHD to HD, or from UHD to SD. In another example, the bit rate may be SD, as such the ABR manager 84 may maintain the quality of the subsequent video fragment as SD.

If the buffer level is below a critical level, at block 274, the player system 16 (e.g., via the modified streaming algorithm) may lower a bit rate for the next selected video variant to the lowest bit rate. Downloading media fragments at the lowest bit rate may allow the buffer level to increase faster than downloading media fragments at a higher bit rate.

In this way, the buffer level may increase and the ABR manager 84 may reduce or eliminate the chances of a buffer underrun. For example, the ABR manager 84 may lower a quality from UHD to SD to avoid the buffer underrun. In another example, the quality may be SD, as such the ABR manager 84 may lower the bit rate to a lowest quality for SD.

At block 276, the player system 16 may enqueue streaming engine update event to simulate downloading a next video fragment. The streaming engine event may determine a timing to download the subsequent fragment and a bit rate of that fragment. For example, the media source engine 76 may determine a subsequent video fragment for downloading. Then, the process may return to block 252 to calculate and add download finish events to queue based on the network speed profile extracted from the historical streaming data, block 254 to increase the buffer level based on the download finish event, and block 256 to process a subsequent playback finish event. Accordingly, performance testing of the modified streaming algorithm may be performed without playing back video or audio fragments.

Figure 9:
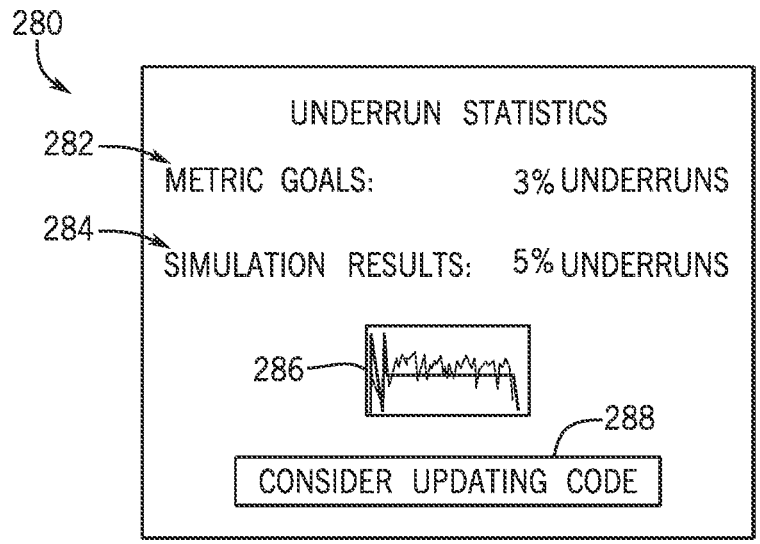
FIG. 9 is a schematic diagram of the player system of FIG. 1, in accordance with an aspect of the present disclosure.

FIG. 9 illustrates a graphical user interface (GUI) 280 displaying underrun statistics after operation in the simulation mode 18. While the current embodiment only illustrates buffer underrun statistics, the GUI 280 may include a number of other statistics useful in providing analysis of a streaming algorithm. For example, the GUI 280 may provide an indication of how often bit rate changes occur, how long an initial buffering prior to playback occurs, an average bit rate observed during a simulated streaming, etc.

The GUI 280 may display one or more metric goals 282, a simulation result 284, a graph 286 illustrating the historical streaming data and metrics corresponding to the metric goals 282, for example. For example, the metric goals 282 indicate a maximum percentage of buffer underruns within a time period for the modified streaming algorithm. As illustrated, the metric goal 282 may be 3% buffer underruns in one day. However, the metric goal 282 may be changed by user input on the hardware layer 74. For example, the metric goal 282 may be 2% of buffer underruns in one week, 5% of buffer underruns in one month, 6% of buffer underruns over 1000 hours, and so on. In another example, the metric goal 282 may be an amount of time without a buffer underrun. In other words, the metric goal 282 may be any suitable percentage or number of buffer underruns as indicated by user input. The simulation results 284 may include the number of buffer underruns the modified streaming algorithm experienced during the performance testing. For example, the modified streaming algorithm may experience 5% of buffer underruns within a day of the performance testing. In certain instances, one or more performance tests may be performed and the GUI 280 may display the number of buffer underruns during each performance test.

The GUI 280 may also display the graph 286 illustrating the historical streaming data used for the performance test. For example, the graph 286 may include the network speed profile, the buffer level, and the number of underruns observed via the simulation. The graph 286 may include information similar to the graph 140 described with respect to FIG. 5. As such, a visual representation of the performance test may be displayed.

The GUI may also include a recommendation notification 288. As illustrated, the recommendation notification 288 states, "CONSIDER UPDATING CODE" to notify the user that one or more parameters the streaming algorithm may be changed to meet the metric goals 282. In certain instances, when the metric goals 282 are met (or are within a prescribed threshold) the recommendation notification 288 may notify the user that the metric goals 282 may be met. In this way, the performance test may be reported.

Figure 10:
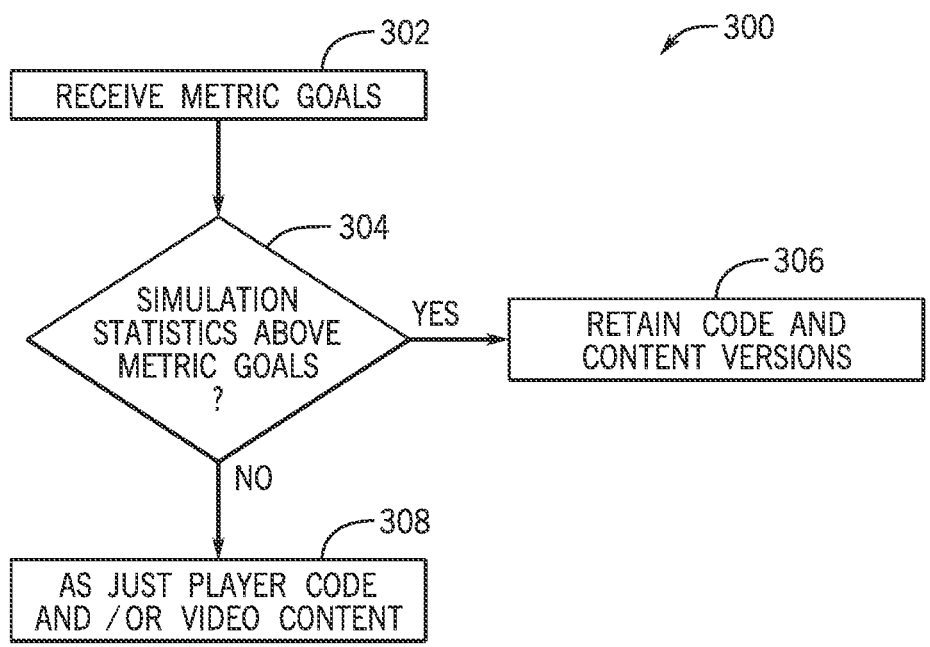
FIG. 10 is a flowchart of a process for updating the player system of FIG. 1, in accordance with an aspect of the present disclosure.

FIG. 10 is a flowchart of a process 300 for determining if the modified streaming algorithm may be deployed to production based on metric goals. As described herein, it may be beneficial to modify the streaming algorithm to fix bugs or improve performance. The performance test may generate one or more statistics that may be compared to one or more metric goals to determine if the modified streaming algorithm may be improved. While the process 300 is described using steps in a specific sequence, additional steps may be performed, the described steps may be performed in different sequences than the sequence illustrated, and/or certain described steps may be skipped or not performed altogether.

At block 302, the player system 16 may receive metric goals. The user may provide one or more metric goals via the GUI 280. For example, the metric goal may be to have less than 3% of buffer underruns in a playback session. In another example, the metric goal may be an amount of time streaming HD quality. Still in another example, the metric goal may include adjusting one or more buffer thresholds to decrease a number or percentage of buffer underruns.

At block 304, the player system 16 may compare the simulation statistics to metric goals. During operation in the simulation mode 18, the player system 16 may generate code dependent statistics based on the historical simulation data. For example, the player system 16 may output the average buffer level across the simulation time, a number of buffer underruns observed, a quality of the video fragment displayed, or the like.

If the simulation statistics meet and/or exceed the metric goals, then the player system 16 may recommend that the modified streaming algorithm tested during the simulation mode 18 meets the expressed goals and/or may be ready for product deployment. However, if the simulation statistics do not meet the metric goals, at block 308, the player system 16 may recommend that the modified streaming algorithm does not meet the expressed goals and/or that further adjustment may be warranted prior to release of the streaming algorithm.

In some embodiments, if metric goals are not met, specific adjustments may be suggested. For example, machine learning may be used to provide specific adjustment recommendations based upon particular patterns observed in the code dependent statistics with compared with training data supplied to a machine learning model. For example, the player system 16 may indicate to change threshold buffer level where adaptive bit rate changes are implemented based upon observing numerous spikes in bit rate changes over time in the simulation.

Accordingly, the player system 16 may rapidly test streaming algorithms and determine the performance impact of modifying the streaming algorithm. During the operation in simulation mode 18, the historical streaming data may be used to evaluate performance impact before product deployment. In this way, higher quality of service may be provided to users.

While only certain features of the invention have been illustrated and described herein, many modifications and changes will occur to those skilled in the art. It is, therefore, to be understood that the appended claims are intended to cover all such modifications and changes as fall within the true spirit of the invention.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A computer-implemented method, comprising:
receiving a streaming algorithm to be tested;
receiving historical network conditions of a player system;
simulating, without playing content, content streaming via the streaming algorithm to test the streaming algorithm prior to deployment based on the historical network conditions by:
identifying a version of a fragment of the content to be used in the simulated content streaming;
simulating a download finish event of the fragment; and
simulating a buffer level adjustment based on the simulated download finish event of the fragment of the content; and
reporting information associated with the simulated content streaming.

2. The computer-implemented method of claim 1, comprising:
receiving a manifest of the content;
identifying and requesting each initial segment of each video variant of the content specified in the manifest; and
identifying from each initial segment, a size of a corresponding streaming fragment and a playback duration of the corresponding streaming fragment.

3. The computer-implemented method of claim 2, comprising:
determining simulated download finish times based upon historical network bandwidth available at a simulated download request time for a particular content fragment and a size of the particular content fragment, identified from a corresponding initial segment.

4. The computer-implemented method of claim 3, comprising:
determining a simulated buffer level based upon simulated download finish events and simulated playback finish events.

5. The computer-implemented method of claim 4, wherein the simulated download finish event causes an increase in a simulated buffer level.

6. The computer-implemented method of claim 4, wherein the simulated playback finish events causes a decrease in a simulated buffer level.

7. The computer-implemented method of claim 1, comprising:
simulating adaptive bit rate modifications based upon a simulated buffer level and the received streaming algorithm.

8. The computer-implemented method of claim 7, wherein the adaptive bit rate modifications comprise increasing, decreasing, or both a bit rate of subsequent fragments of the content.

9. The computer-implemented method of claim 7, wherein the adaptive bit rate modifications are dictated by the received streaming algorithm.

10. The computer-implemented method of claim 1, comprising:

identifying, via a GUI, a metric goal of the streaming algorithm being tested;
comparing the metric goal with the information to identify whether the metric goal is met by the streaming algorithm; and
providing an indication of whether the metric goal is met by the streaming algorithm in the GUI.

11. The computer-implemented method of claim 1, wherein the information comprises a number of buffer underruns, an amount of time buffering, a number of bit rate adjustments, or any combination thereof observed during the simulated content streaming.

12. A non-transitory computer-readable medium comprising computer-executable instructions that, when executed by one or more processors of one or more computers, cause the one or more computers to:
receive an undeployed algorithm to be tested;
receive historical streaming data generated by player system operating with a deployed streaming algorithm;
extract a network speed profile from the historical streaming data;
simulate, without playing media content, content streaming via the undeployed algorithm to test the streaming algorithm based on the network speed profile by:
identifying a version of a fragment of the media content to be used in the simulated content streaming;
simulating a download finish event of the fragment; and
simulating a buffer level adjustment based on the simulated download finish event of the fragment of the media content; and
reporting information associated with the simulated content streaming.

13. The non-transitory computer-readable medium of claim 12, comprising computer-executable instructions that, when executed by the one or more processors, cause the one or more computers to:
receive metric goal indicative of a percentage of buffer underruns within a threshold period of time;
identify a streaming statistic of the information associated with the simulated content streaming;
determine the streaming statistic meets the metric goal; and
send an indication that the streaming algorithm meets the metric goals.

14. The non-transitory computer-readable medium of claim 12, wherein the computer-executable instructions that, when executed by the one or more processors, cause the one or more computers to:
simulate adjusting a bit rate of the version of the fragment based on the buffer level by queuing an adaptive bit rate manager update event by:
increasing or maintaining the bit rate if the buffer level is above a warning level;
decreasing the bit rate if the buffer level is below a warning level; and
decreasing the bit rate to a lowest bit rate if the buffer level is below a critical level.

15. The non-transitory computer-readable medium of claim 12, comprising computer-executable instructions that, when executed by the one or more processors, cause the one or more computers to determine the simulated download finish event based on the network speed profile at a simulated download request time for a particular fragment and a size of the particular fragment.

16. A player, comprising:
a streaming algorithm configured to generate historical streaming data during operation in a normal mode, wherein the historical streaming data comprises a bit rate and network conditions; and
a modified streaming algorithm configured to simulate content streaming without playback of content via the modified streaming algorithm to test the modified streaming algorithm based on the historical streaming data by:
receiving the historical streaming data from a database;
identifying a version of a fragment of the content to be used in the simulated content streaming;
simulating a download finish event of the fragment based on network conditions and one or more attributes of the modified streaming algorithm;
simulating a buffer level adjustment based on the simulated download finish event of the fragment of the contents; and
reporting information associated with the simulated content streaming;
wherein, the player is configured to implement the streaming algorithm during operation in the normal mode and the modified streaming algorithm during a second mode operation in a simulation mode.

17. The player of claim 16, wherein the modified streaming algorithm comprises a bit rate manager configured to adjust a bit rate of the version of the fragment of content based on the buffer level.

18. The player of claim 17, wherein the player comprises a streaming engine configured to not to push the fragment to a hardware layer for display in the simulation mode, and wherein the player does not playback the fragment in the simulation mode.

19. The player of claim 16, wherein the player is configured to simulate the buffer level adjustment during the simulation mode by:
simulating an increase of the buffer level in response to simulating the download finish event; and
simulating a decrease of the buffer level in response to simulating a playback event.

* * * * *